Jan. 12, 1932.  H. E. JENKINS  1,840,778
RESAW SETWORKS
Filed Jan. 28, 1930  4 Sheets-Sheet 1
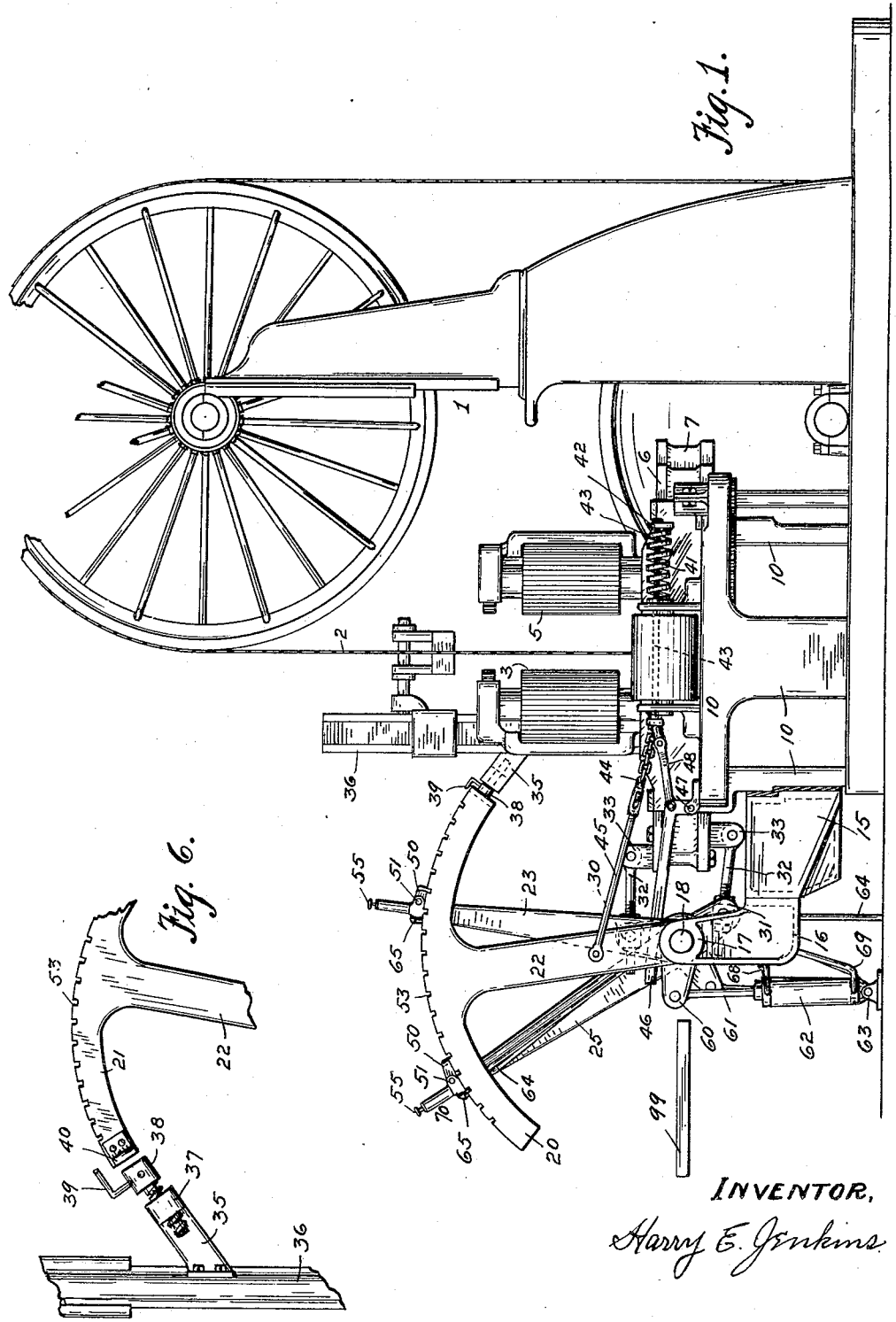
INVENTOR,
Harry E. Jenkins Jan. 12, 1932.  H. E. JENKINS  1,840,778
RESAW SETWORKS
Filed Jan. 28, 1930    4 Sheets-Sheet 2
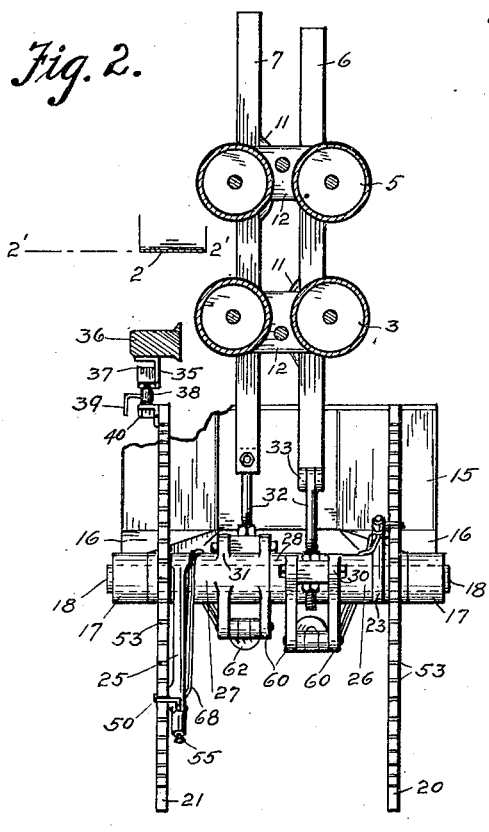
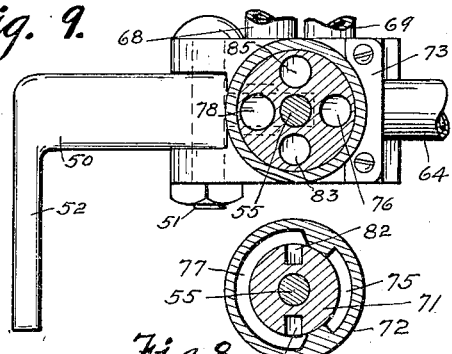
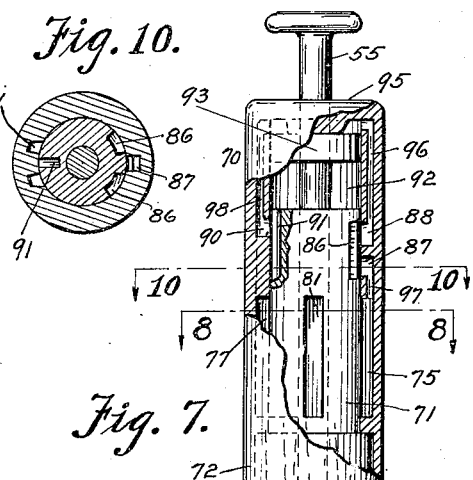
INVENTOR.
Harry E. Jenkins INVENTOR,
Harry E. Jenkins.

Jan. 12, 1932.  H. E. JENKINS  1,840,778
RESAW SETWORKS
Filed Jan. 28, 1930  4 Sheets-Sheet 4

Inventor
Harry E. Jenkins

Patented Jan. 12, 1932

1,840,778

UNITED STATES PATENT OFFICE

HARRY E. JENKINS, OF PORTLAND, OREGON, ASSIGNOR TO HESSE-ERSTED IRON WORKS, OF PORTLAND, OREGON, A CORPORATION OF OREGON

RESAW SETWORKS

Application filed January 28, 1930. Serial No. 423,993.

This invention relates to controls for adjusting the lumber feed rolls of a resaw for different sizes of lumber to be sawn, and to power actuation for the controls.

It should be borne in mind that not only undersized pieces of lumber are required to be resawn into two pieces equally absorbing the scant thickness of the original piece, but irregular pieces as well as tapered pieces consequent upon the Rhodes system of taper sawing in the saw mill. Moreover, a great variety of sizes ranging from thin to comparatively wide lumber are commonly fed to resaws requiring rapid resetting of the feed rolls through the full range of their opening. My invention has been brought down to practice in a series of tests and extended service under conditions above named.

The principal object of my invention, therefore, is to provide a resaw with setworks adapted to the rapid and accurate resetting of the feed rolls with relation to the saw throughout the full range of widths of the machine.

Another object is to provide setworks adapted to compensate equally between the feed rolls to allow for errors in the size of lumber being sawn.

Another object is to provide controls for setting the rolls of a resaw either manually or with the aid of power at the option of the operator without preparatory changes or adjustments.

Another object is to provide a simple valve in the handle of each operating lever for control of power applied to the levers, to move them in either direction according to the direction of torque in the grip of either handle.

A further object is to so position the control levers, that the operator may stand erect and facing generally both the sawing operation and the pieces of lumber next in turn to be sawn.

Still further objects and advantages will be seen as set forth in the following description with reference to the accompanying drawings.

Figure 1 of the drawings is a view in front elevation of a vertical resaw embodying my invention.

Figure 2 is a fragmentary plan view of my set-works engaged with detached feed roll mechanism of a resaw.

Figure 3 is an end view of the set-works with certain air pipes removed, in elevation.

Figure 6 is a fragmentary side view of an adjustable stop for the quadrants of the set-works in elevation.

Figure 7 is a fragmentary side view in elevation of one of the power control handles of the operating levers shown partially in section.

Figure 8 is a plan view of the handle shown in section taken on the line 8—8 of Fig 7.

Figure 9 is a plan view of the handle shown in section taken on the line 9—9 of Fig. 7.

Figure 10 is a plan view of the handle shown in section taken on the line 10—10 of Fig. 7 showing the latch control valves.

Figure 15:
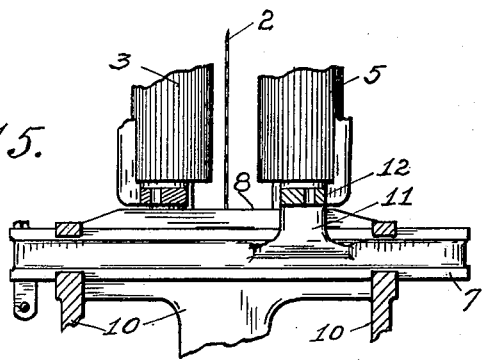
Fig. 15 is a fragmentary front view in elevation and vertical section taken on a longitudinal plane midway between the slide bars shown in Fig. 2, and disclosing the mounting of the feed rolls and their relation to the slide bars.
Figure 16:
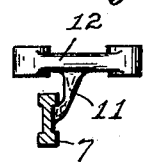
Fig. 16 is a detached end-elevational view of one of the slide bars in section, showing a yoke bracketed thereto.
Figure 12:
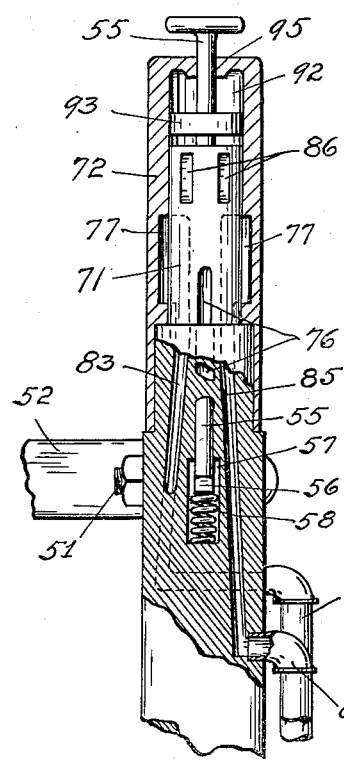
Fig. 12 is a fragmentary rear elevational view of the grip on the lever shown in Fig. 7, the barrel and a part of the lever being shown in section.

Referring to the above drawings in detail, a conventional upright resaw, generally indicated by the reference numeral 1, includes a band saw 2 cutting on a line 2′—2′ (or center of the saw kerf) and the usual two sets of feed rolls 3 and 5 mounted and driven in the customary manner, and adapted to open and close separately about the saw line, the inner set 5 being the guide rolls. A pair of parallel slide bars 6 and 7 adapted to slide longitudinally in guide 8 formed in a stand 10 of the framework of the machine, each having inwardly disposed brackets 11 and yokes 12 serve to mount the pairs of rolls 3 and 5 respectively, so that reciprocation of either slide bar will open or close its respective set of rolls. In the particular construction shown in Figs. 15 and 16 the pair of rolls 5 is mounted in one yoke 12 integrally connected with the slide-bar 7 by the bracket 11, while the set of rolls 3 is similarly mounted on the slide-bar 6.

A bracket 15 rigidly fixed to the side of the stand 10 forms the base mounting for my improved set-works. A pair of spaced, laterally and upwardly projecting brackets 16, bolted to the base 15, provide journal bearings 17 for a transverse rocker-shaft 18. A pair of similar, spaced quadrants 20 and 21 having reach arms 22 are keyed in line to the shaft 18 at either side adjacent the bearings, while spaced lever arms 23 and 25 having hubs 26 and 27, respectively, are loosely mounted to rock on the shaft 18, and extending upwardly adjacent the quadrants 20 and 21 respectively, form independently right and left hand operating levers adapted to cooperate with their respective quadrants for a purpose to be later described. A loose spacing ring 28 on the shaft 18, serves as a spacing filler between the hubs.

A bell-crank 30 formed in the hub 26 and disposed upwardly, and a similar bell-crank 31 extending downwardly from the hub 27 are positioned in operative alignment with the slide bars 6 and 7 respectively, to which they are engaged by adjustable connecting rods 32 pivotally mounted in the extremities of the bell-cranks and in lug attachments 33 rigidly fixed to the near ends of the corresponding slide bars.

A bracket-arm 35 rigidly mounted on the saw-guide post 36 of the machine terminates in a threaded nut 37, into which an adjustable stop 38 is screwed and adjusted with the aid of a handle 39 within reach of the operator. The arm 39 is thrown through an arc of rotation limited by stops, not shown, to afford a rapid correction in the position of the quadrants representing $\frac{1}{16}$ inch correction in the feed rolls, or half of the standard space setting provided for in the quadrants, and further to be explained. An angle wing 40 rigidly fixed to the inner end of the quadrant 21 is normally held in contact with the stop 38 by the pressure of a compression coil spring 41 against the head 42 of a plunger rod 43 extending through the bearing in the stand 10, and engaging a link-chain 44 which is connected to the arm 22 by an adjustable rod 45. A spring releasing foot-pedal 46 fulcrumed in an attachment 47, engages the plunger 43 by a connecting rod 48.

Each lever 23 and 25 has a latch 50 pivoted thereto at 51 the swinging end being turned outwardly to form a tooth 52 adapted to seat in any one of a graduated series of notches 53 formed in the rim of each of the quadrants. These notches correspond to standard setting of the feed rolls in fractions of an inch (in this case $\frac{1}{8}$ inch intervals). A plunger 55 extends axially through the handle, and is operable by pressure of the operator's thumb, to impart a downward thrust upon a tongue 56, (see Fig. 7) formed integral with the latch and free to rock in a recess 57 formed in the head of the lever. The latch is held normally in engagement by a coil spring 58 seated in the handle and bearing against the tongue.

Each of the levers 23 and 25 is actuated by air or steam power in accordance with the following description. Each of the hubs 26 and 27 has integrally formed bell-crank arms 60 pivotally connected to a piston rod 61 for reciprocation in a double acting cylinder 62 either air or steam actuated, the direction of the stroke depending upon to which end of the cylinder pressure is admitted. Thus, the lever 23 and the bell-crank 30 include one bell-crank 60, all being integrally formed with the hub 26, while, similarly, the other bell-crank 60 together with the bell-crank 31 and the lever 25 are formed integrally with the hub 27. The cylinders are mounted to rock on trunnion bearing 63. A flexible pressure supply hose 64, in this case supplying compressed air, leads around the shaft 18 and along the inside face of the lever and taps an opening 65 in the head of the lever. Openings 66 and 67 in the side of the lever head communicate through flexible tubes 68 and 69 with top and bottom openings respectively, in the cylinder 62, and serve either as exhaust or supply for the cylinder.

Figure 13:
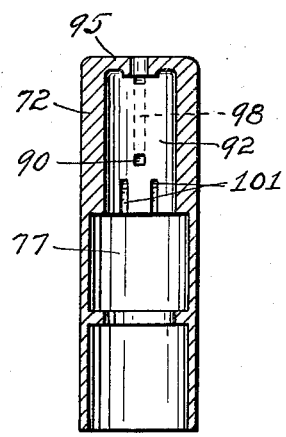
Fig. 13 is a rear elevational view of the barrel shown in Fig. 12 and shown in vertical section to disclose the interior of the forward half of the barrel.
Figure 14:
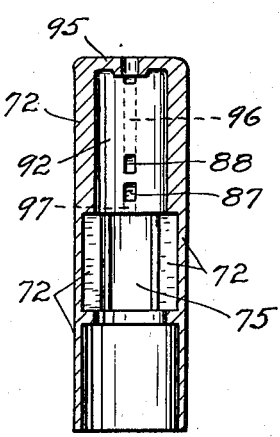
Fig. 14 is a view in vertical section and in elevation of the complementary half of the barrel shown in Fig. 13 and disclosing the interior of the rear half of the barrel.

The upper end of each lever arm 23 and 25 terminates in a handle 70 having an inner cylindrical bearing 71 integral with the lever and an outer barrel 72 rotatably fitted thereon to form a grip to be held in the grasp of the operator's hand. A retaining clip 73 secured to the shoulder of the lever serves both to limit the angle of rotation of the barrel and to retain it in position axially. Recesses in the contact faces between the bearing and the barrel together with passageways in the bearing provide a system of air valves, and in the particular arrangement shown, (see Figs. 7 to 10 inc.) a limited recess 75 in the barrel communicates with a bore 76 and the pressure opening 65, while a recess 77 in the same zone communicates with a bore 78 opening into the recess 57 having an exhaust opening 80. Diametrically opposite recessed grooves 81 and 82 communicate through bores 83 and 85 with the openings 66 and 67 respectively and are both open to the recess 77 when the barrel is in a neutral position. In a separate zone, (see Figs. 7 and 10), a pair of spaced recesses 86 formed in the bearing provide by-passes adapted to register with ports 87 and 88 formed in vertical alignment in the barrel when the barrel is rotated from a neutral position. On the opposite side of the barrel a port 90 registers normally with a groove 91 opening into a cylindrical chamber 92 in the upper end of the barrel. A piston head 93 rigidly mounted on the plunger rod 55 is adapted to reciprocate in the chamber 92 between the end of the bearing and a cylinder head 95 forming the end of the barrel. A by-pass 96 leads from the port 88 to the top of the chamber 92 and a by-pass 97 connects the port 87 with the pressure recess 75. Similarly a by-pass 98 connects the port 90 and the upper end of the chamber 92. Spaced, vertically directed passageways 101, formed in the inner faces of the barrel, communicate with the recess 77 and are adapted to register with the groove 91 when the grip 72 is rotated in either direction out of the neutral position, see Figs. 10 and 13. For the convenience of the operator a platform 99 (see Fig. 1) is so placed that the handle-grips 70 may be easily grasped, the operator standing in an erect posture when he may view the lumber 100 being sawn, and that in readiness in front of the machine.

From the above description it will readily be seen that, when both grips 70 are held in a neutral position both ends of each cylinder 62 are open to exhaust by way of the tubes 68 and 69, the bores 83 and 85, the grooves 81 and 82, the recess 77 the bore 78, the recess 57 and the bore 80, so that both piston rods 61 are free to move in either direction. Thus either lever 23 or 25 may be rocked on the bearing 18 manually, having first depressed the plunger rod 55 and releasing the latch 50. When a lever is to be moved through a considerable arc and it is desired to apply the power of the cylinder 62 to rock the lever, the grip 72 being rotated on the bearing 71, a by-pass 86 registering with the ports 87 and 88 will admit air pressure through the by-passes 96 and 97 to the top of the cylinder chamber 92, the port 90 being closed, and will depress the piston head 93 and the rod 55, thus releasing the latch, the under portion of the chamber 92 being open to exhaust through the groove 91 by way of one of the passageways 101. At the same time one of the grooves 81 or 82, as the case may be, according to the direction of rotation of the grip, will register with the recess 75 and actuate the cylinder 62 concerned, in the direction desired, and thus rock either of the hubs 26 and 27, as desired with the bell-cranks rigidly fixed thereto. Rocking of the cranks 30 and 31 will impart a corresponding longitudinal motion to the bars 6 and 7 and the pairs of rolls 3 and 5 respectively. A lever having been rocked by power to approximately the position desired, the grip is again rotated to its neutral position and the tooth 52 of the latch 50 allowed to seat in a selected notch 53.

The arm 39 for adjusting the screw 38 may obviously be controlled by action of an air cylinder (not shown) under control of the operator.

After each change of saws on the machine the connecting rods 32 are adjusted until the position of any setting of the levers, when the latches are seated, will result in a setting of the rolls with relation to the saw line corresponding to the lever setting, and the arm 39 established at a base or zero position. Fractional settings of the rolls in smaller divisions than represented by the notches of the quadrants may be attained by turning the screw 38 to rock the quadrants keyed to the shaft 18 away from the saw, thus opening both rolls equally away from the saw line when the latches are seated by reason of the equal bell-cranks 30 and 31 being disposed on opposite sides of the center of rotation on the shaft 18.

Figure 4:
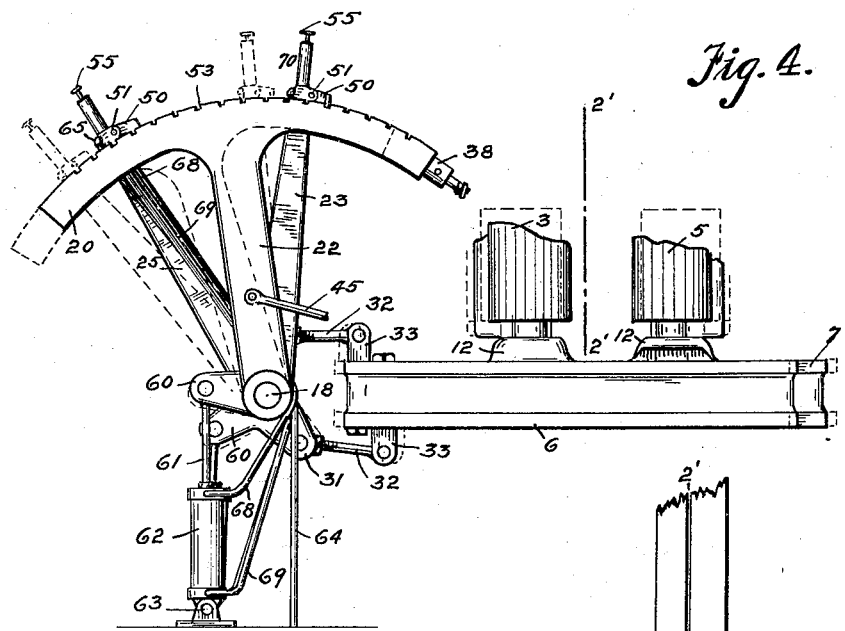
Figure 4 is a fragmentary front view of the set-works engaged with feed roll members of the resaw in elevation; broken lines showing compensating position of the mechanism.
Figure 5:
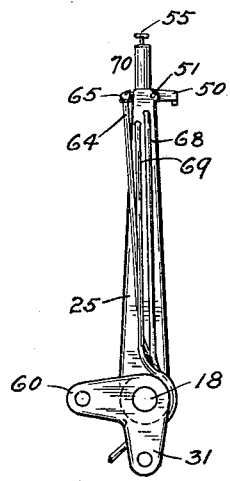
Figure 5 is the side view of the assembly of one of the control members in elevation viewed from the inner side.
Figure 11:
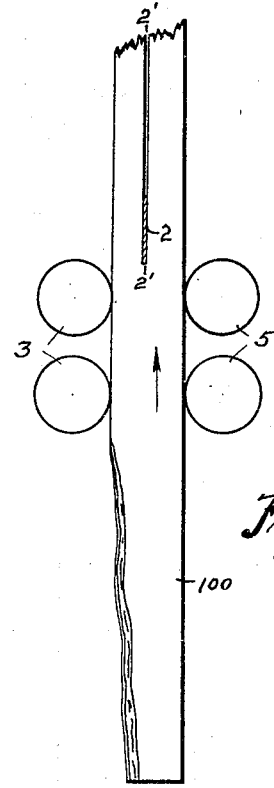
Figure 11 is a diagrammatic plan view showing an irregular piece of lumber being resawn.

Similarly when oversized pieces of lumber are fed between the rolls the quadrants will be forced backwardly, the spring 41 yielding to allow a limited rocking motion and restoring the quadrants to normal position as gaged by the stop 38 after the excess thickness of lumber has passed from between the rolls. The spring may also be caused to yield by forcing the lever 46 downwardly as when the pressure of the rolls against the lumber is to be released. As the lumber is fed to the rolls, the various pieces are turned as required to guide a true and evenly sawn face against the inner rolls 5, or guide rolls, and in many cases where rough protruding surfaces project from the opposite face, or in case of irregularly sawn pieces, or those having tapering or unsawn edges, (as shown in Fig. 11), the operator will release the latch of the lever 23 controlling the outer rolls 3, and either by manual pressure against the lever or by turning the grip 70 to independently actuate the rolls 3, causing them to follow-up with pressure against the face of the lumber in order to hold the even face of the lumber firmly against the guide rolls 5.

It will be noted that in parting the rolls to full extent both levers are thrown back away from the saw line and the reverse for bringing them close together, so that either operation over the full extent of travel of the rolls may be accomplished by moving the levers simultaneously by a very easy, natural, manual movement. This freedom of movement of the setting levers, together with the ease of throwing over the adjusting arm 39, or the freeing of the feed rolls by the use of the foot-pedal 46, afford means of prompt control of the sawing operations under all conditions without any waste of time, and a great saving of the material being sawn results from the facility of manipulation and from the fact that both the material passing through the feed rolls and the pieces next in readiness to be sawn are in full, direct view of the operator in his erect position between the setting levers and facing the work. He may thus anticipate the many adjustments to be made for rapid and correct sawing.

Having described my invention, what I claim is:

1. In feed roll setting mechanisms for resaws, a pair of individually operable roll setting levers, each lever in said pair operatively engaging one pair of the two pairs of rolls of the resaw, a manually controlled latch in the handle of said lever and means operable by rotation of the handle for actuating said latch and said lever by applied power at the option of the operator according to the conditions involved.

2. In a lever for setting feed rolls of a resaw, a plunger actuated latch for locking said lever, a plunger rod and dual means independently operable for actuating said plunger; one of said means being manual and the other being a pressure operable piston.

3. In feed roll setting mechanisms for resaws, a pair of spaced quadrants keyed in line to a transverse shaft, said shaft being journaled to rock in suitable bearings, an adjustable stop for seating the quadrants and means of constraining said quadrants in tension against said stop, feed roll setting levers loosely mounted to rock individually on said shaft, said levers being spaced apart to provide standing room for the operator and mated each to one of said quadrants, hand controlled latches in the handle end of each lever, said latches being adapted to seat in a series of graduated notches in said quadrants, a pair of crank arms oppositely disposed radially from said shaft, each arm being integral with one of said levers, and adjustable connecting rods between each of said crank arms and the slide bar upon which one pair of feed rolls is mounted.

4. In a lever for setting feed rolls of a resaw, a handle at the swinging end of said lever, a plunger actuated latch for locking said lever, a barrel forming a grip mounted to rotate between limits on the shank of said handle, a head for the upper end of said barrel, a cylindrical chamber in said barrel between said head and said shank, a plunger rod extending axially through said head and said shank and operatively engaging said latch, a piston rigidly mounted on said rod and adapted to reciprocate in said chamber, means of actuating said latch either by manual pressure axially on said rod, or by air pressure, or the like, against said piston, and means operable by partial rotation of said grip for admitting and releasing pressure against said piston.

5. In a lever for setting feed rolls of a resaw, a bell-crank formed integral with said lever and having an arm thereof operatively engaging the feed rolls, the other arm being operatively connected by a piston rod to a piston fitted to reciprocate in a double acting cylinder, flexible tubes connecting each end of the cylinder chamber with separate ducts entering the end shank of said lever, an exhaust duct and a pressure intake duct entering said shank, a barrel fitted to rotate between limits on said shank and complementary recesses and ports in the contact surfaces between said shank and said barrel adapted to form valves operably registering upon rotation of said barrel for admission of pressure to and exhaust from either end of the cylinder chamber in said double acting cylinder according to the direction of rotation of said barrel from a neutral exhaust position of said barrel.

6. In feed roll setting mechanisms, an air valve handle for a setting lever consisting in a cylindrical shank forming the end of the lever, a cylindrical grip fitted to rotate on said shank between limits, said grip being manually operable, exhaust and supply ducts communicating to ports in said shank, recesses in the inner contact surfaces of said grip arranged in one zone, said recesses being adapted to register with different ports at different angles in rotation of said grip, thus forming valves in said zone for actuating said lever, and similar complementary ports and recesses in another zone along the shank for actuating a plunger, in order to release said setting lever.

7. In set-works for resaws, including a pair of spaced feed-roll setting levers disposed vertically and arranged in a line at one side of the resaw, a station or platform for the operator positioned between the levers of said pair, said line of said pair of levers being parallel to the direction of feed of lumber in the feed rolls, and the movement of said levers being in vertical planes disposed at right angles to said direction of feed.

8. In set-works for resaws, including a pair of spaced quadrants keyed in line to common shaft mounted to rock, said quadrants being disposed vertically and near the cutting line of the saw, said cutting line and said shaft being disposed in parallel; a pair of individually operable feed-roll setting-levers mated one to each said quadrant and adjustable thereto at intervals corresponding to standard divisional settings of the feed rolls with reference to the cutting line of the saw, a platform for the operator positioned between said quadrants, and an adjustable stop for seating the said quadrants; said stop being actuated by means in easy reach of the operator, in order to set out the quadrants to correct thereby the setting of said levers and the feed rolls a distance corresponding to one half of said standard setting during continuous sawing operations.

HARRY E. JENKINS.